United States Patent [19]

Sextro

[11] Patent Number: 5,156,113
[45] Date of Patent: Oct. 20, 1992

[54] HEATED PET WATERING DISH APPARATUS

[76] Inventor: Robert J. Sextro, 3916 Stone Park Blvd., Sioux City, Iowa 51103

[21] Appl. No.: 808,471

[22] Filed: Dec. 16, 1991

[51] Int. Cl.$^5$ ............................................... A01K 7/00
[52] U.S. Cl. ......................................... 119/73; 119/61
[58] Field of Search .................... 119/73, 61, 51.01

[56] References Cited

U.S. PATENT DOCUMENTS

| | | | |
|---|---|---|---|
| 2,528,742 | 11/1950 | Loffing | 119/73 |
| 2,674,227 | 4/1954 | Saunders | 119/73 |
| 2,973,743 | 3/1961 | Parks et al. | 119/73 |
| 3,205,861 | 9/1965 | Moore | 119/61 |
| 4,108,156 | 8/1978 | Sitter | 119/73 |
| 4,162,684 | 7/1979 | Loveless | 119/73 |

FOREIGN PATENT DOCUMENTS 3715306 11/1988 Fed. Rep. of Germany ........ 119/73

*Primary Examiner*—John G. Weiss
*Attorney, Agent, or Firm*—Leon Gilden

[57] ABSTRACT

A container enclosure includes a top wall, with an opening directed therethrough receiving a bucket member therewithin for containing fluid for the use of pets. Prevention of freezing of water during depressed temperatures is effected by the enclosure utilizing thickly insulated walls, as well as a floor and top wall about the bucket member, with an illumination bulb directed into the enclosure within the enclosure chamber to maintain the water in an unfrozen state.

2 Claims, 4 Drawing Sheets

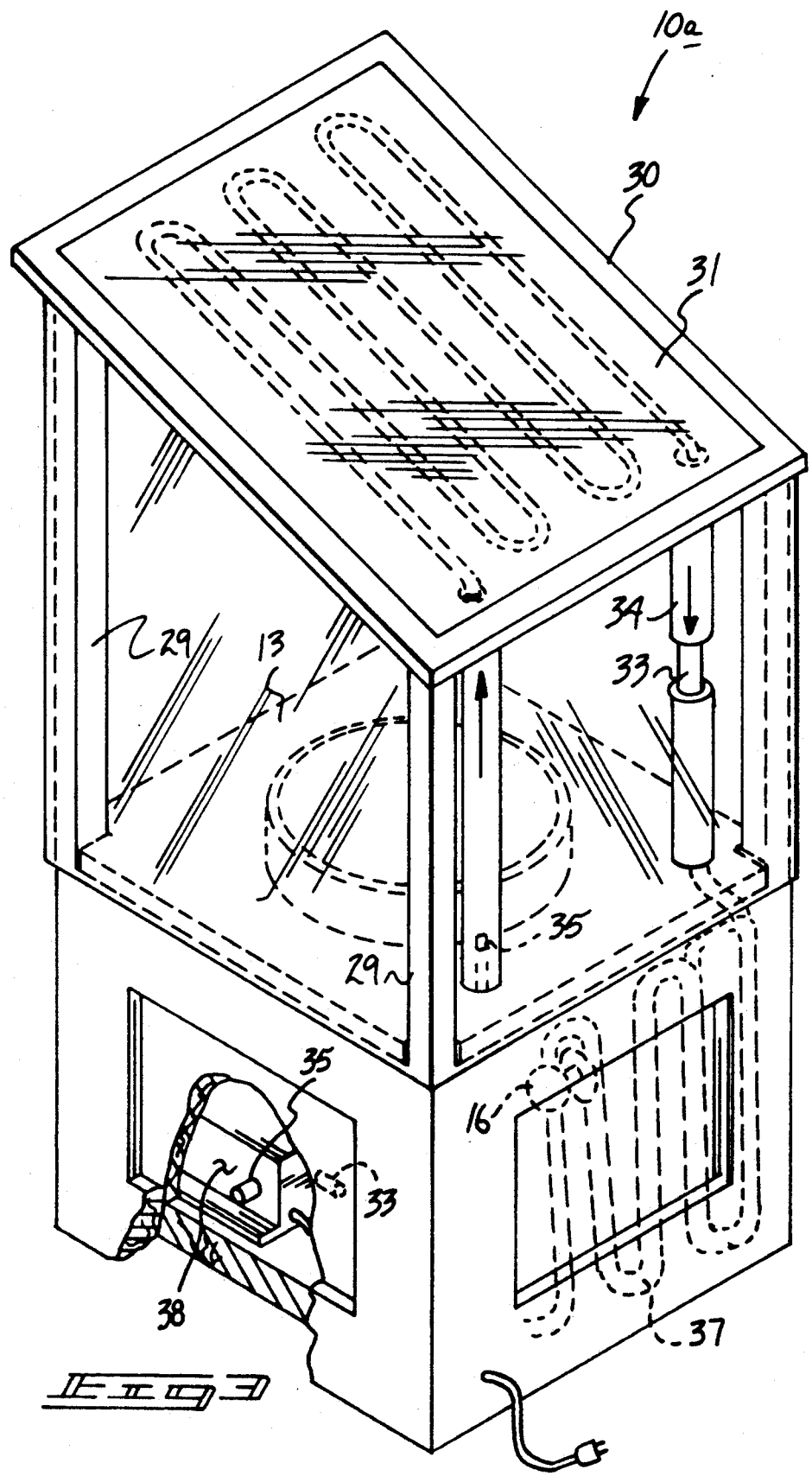

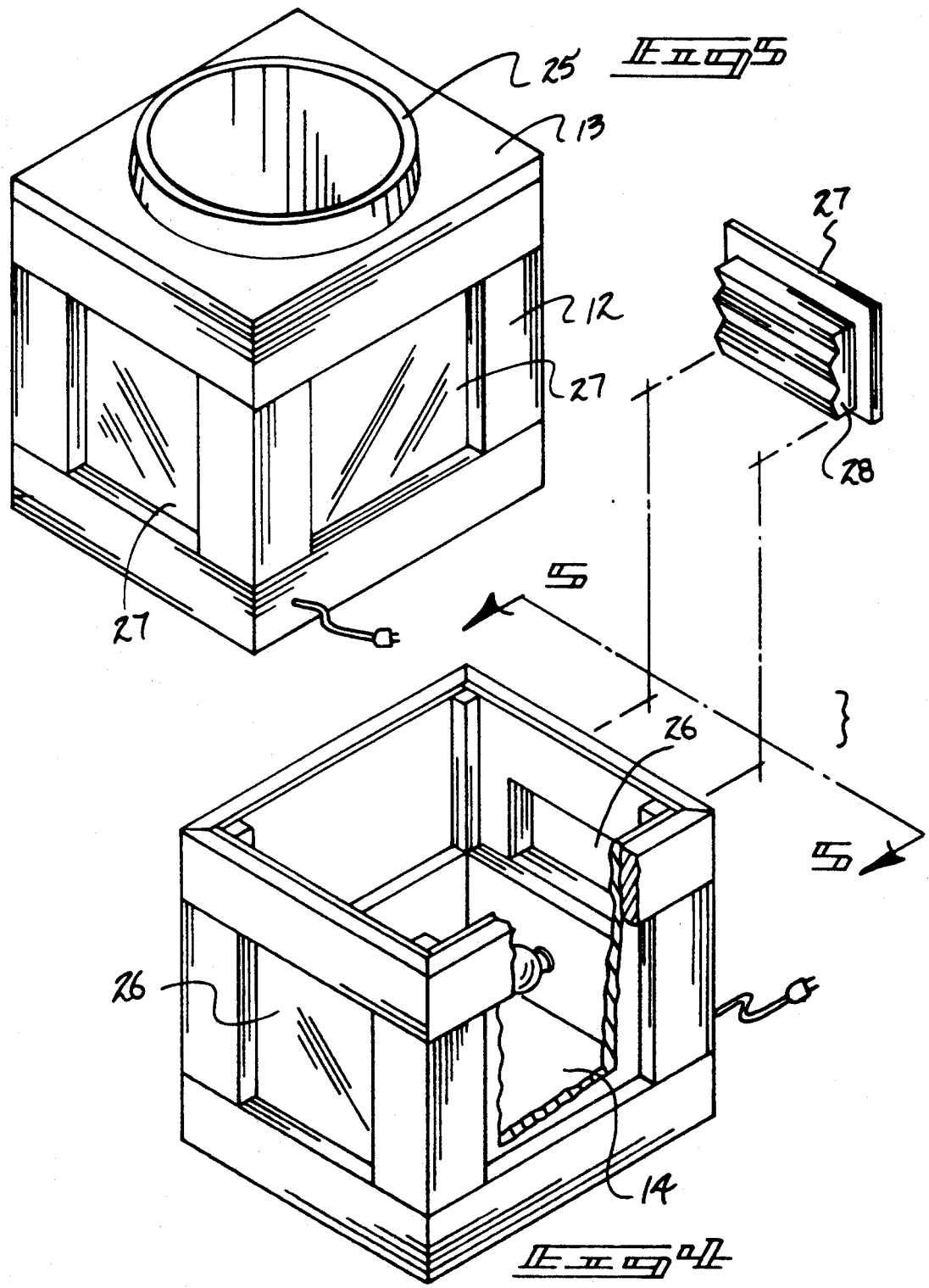

HEATED PET WATERING DISH APPARATUS

BACKGROUND OF THE INVENTION

1. Field of the Invention

The field of invention relates to pet watering dish structure, and more particularly pertains to a new and improved heated pet watering dish apparatus arranged to maintain the water in an unfrozen state during use.

2. Description of the Prior Art

The freezing of drinking fluid for pets is particularly a hazardous condition available in Northern portions of the United States, as well as other countries oriented closer to the earth's polar regions, wherein the instant invention attempts to overcome deficiencies of the prior art by providing a heated pet food structure utilizing illumination bulbs projected within an insulated container to maintain water in a fluid state. Prior art structure to maintain contents at various temperatures is exemplified in U.S. Pat. No. 4,798,173 to Wolgren wherein a pet dish includes an internal coolant to prevent spoilage of foods therewithin.

U.S. Pat. No. 4,869,385 to Blinsinger sets forth a water dish including a liquid in walls thereof.

U.S. Pat. No. 4,007,711 to Michael sets forth an anti-pest pet dish preventing crawling insects from projecting into the pet dish structure.

U.S. Pat. No. 4,827,874 to Mahan sets forth an electrified pet dish preventing crawling insects access to the pet dish structure.

Accordingly, it may be appreciated that there continues to be a need for a new and improved heated pet watering dish apparatus as set forth by the instant invention which addresses both the problems of ease of use as well as effectiveness in construction and in this respect, the present invention substantially fulfills this need.

SUMMARY OF THE INVENTION

In view of the foregoing disadvantages inherent in the known types of pet dish apparatus now present in the prior art, the present invention provides a heated pet watering dish apparatus wherein the same is addressed to the heating of water preventing its freezing within a pet dish. As such, the general purpose of the present invention, which will be described subsequently in greater detail, is to provide a new and improved heated pet watering dish apparatus which has all the advantages of the prior art pet dish apparatus and none of the disadvantages.

To attain this, the present invention provides a container enclosure including a top wall, with an opening directed therethrough receiving a bucket member therewithin for containing fluid for the use of pets. Prevention of freezing of water during depressed temperatures is effected by the enclosure utilizing thickly insulated walls, as well as a floor and top wall about the bucket member, with an illumination bulb directed into the enclosure within the enclosure chamber to maintain the water in an unfrozen state.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, as especially the scientists, engineers and practitioners in the art who are not familiar with patent or legal terms or phraseology, to determine quickly from a cursory inspection the nature and essence of the technical disclosure of the application. The abstract is neither intended to define the invention of the application, which measured by the claims, nor is it intended to be limiting as to the scope of the invention in any way.

It is therefore an object of the present invention to provide a new and improved heated pet watering dish apparatus which has all the advantages of the prior art pet dish apparatus and none of the disadvantages.

It is another object of the present invention to provide a new and improved heated pet watering dish apparatus which may be easily and efficiently manufactured and marketed.

It is a further object of the present invention to provide a new and improved heated pet watering dish apparatus which is of a durable and reliable construction.

An even further object of the present invention is to provide a new and improved heated pet watering dish apparatus which is susceptible of a low cost of manufacture with regard to both materials and labor, and which accordingly is then susceptible of low prices of sale to the consuming public, thereby making such heated pet watering dish apparatus economically available to the buying public.

Still yet another object of the present invention is to provide a new and improved heated pet watering dish apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is an isometric illustration of a modification of the invention.

FIG. 4 is an isometric illustration of the invention illustrating use of the lens members mounted through the container.

FIG. 5 is an isometric illustration of the invention illustrating the lens members mounted within the container.

DESCRIPTION OF THE PREFERRED EMBODIMENT

Figure 1:
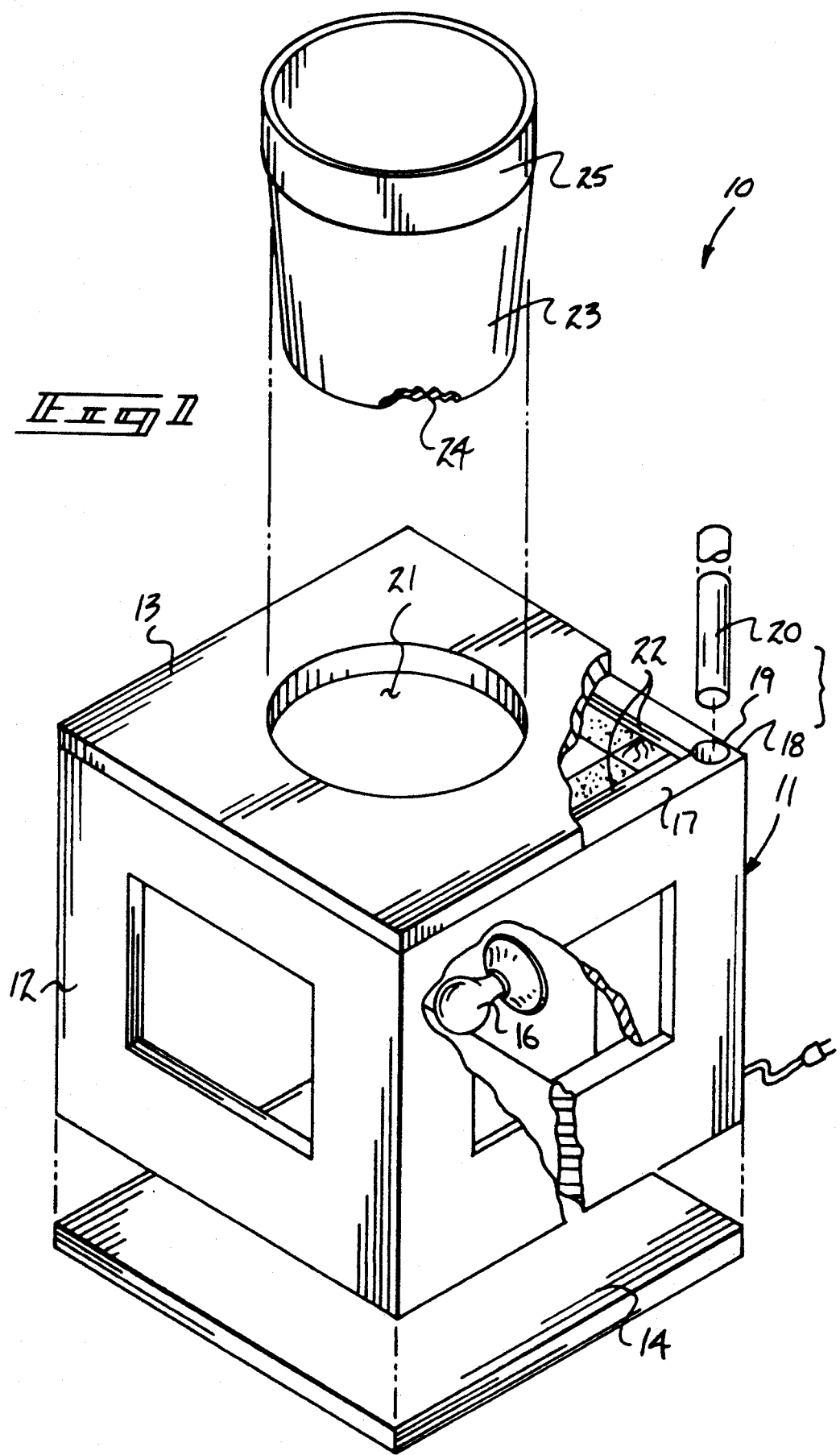
FIG. 1 is an isometric illustration of the instant invention.
Figure 2:
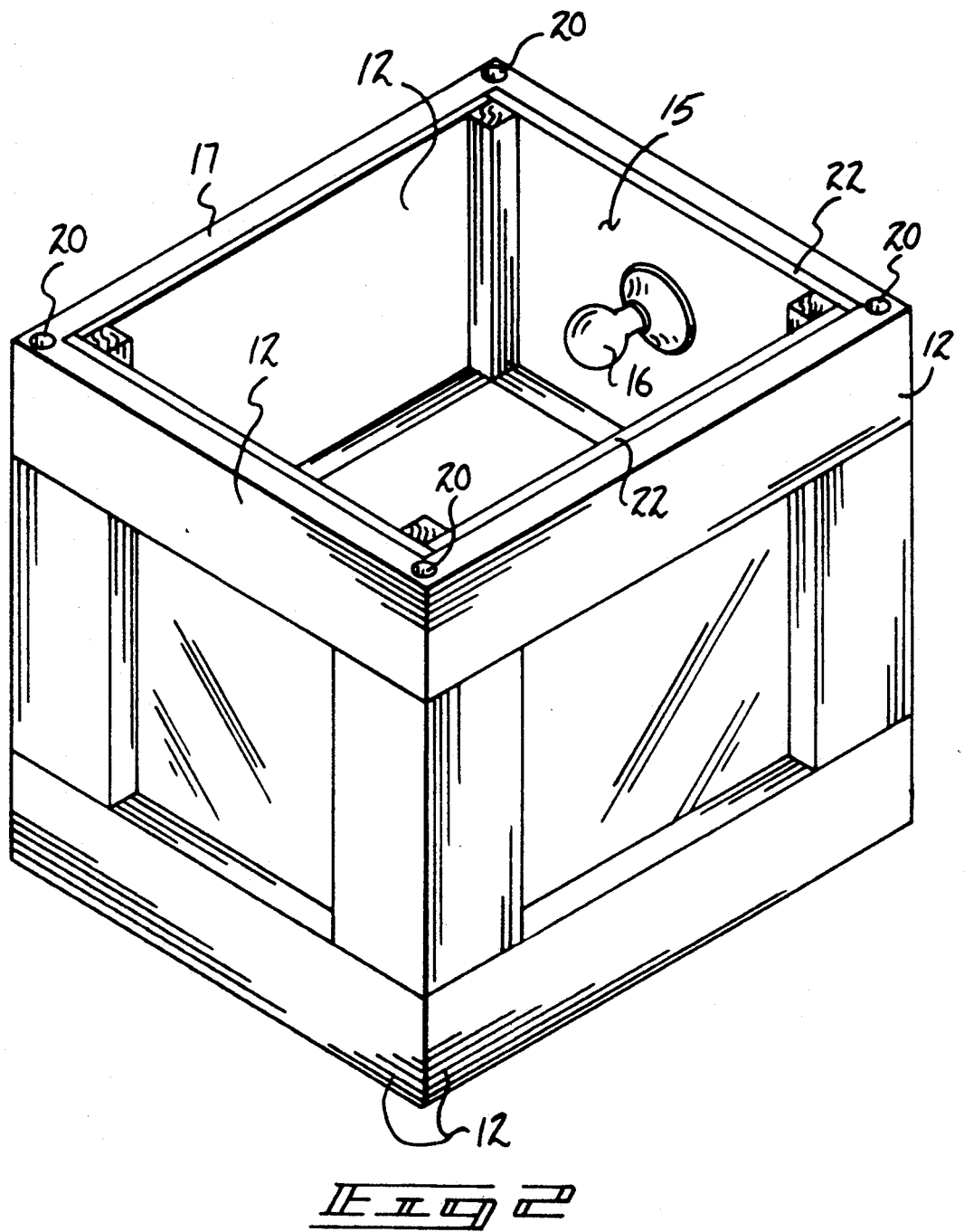
FIG. 2 is an isometric illustration of a container portion of the invention.

With reference now to the drawings, and in particular to FIGS. 1 to 5 thereof, a new and improved heated pet watering dish apparatus embodying the principles and concepts of the present invention and generally designated by the reference numerals 10 and 10a will be described.

More specifically, the heated pet watering dish apparatus 10 of the instant invention essentially comprises a housing 11, including side walls 12, a top wall 13, and a floor plate 14. The side walls in cooperation with the top wall and floor plate define a housing chamber 15 therewithin containing an illumination bulb 16 projecting into the housing chamber through a side wall, or alternatively may be directed through the top wall 13 or the floor plate 14. The side walls (see FIG. 2) define a side wall top surface corner portion 18 at the intersection of each of the side walls that is orthogonally oriented relative to the side walls that may be optionally provided with a cylindrical receiving bore 19 orthogonally directed in through the top surface corner portions 18 to receive a cylindrical stabilizing bar 20 at each corner portion 18 to enhance stabilizing of the organization should materials of lessened weight be utilized, such as polymerics in lieu of fibrous wood-type materials.

The top wall 13 includes a top wall opening 21 defined by a predetermined first diameter arranged to receive a cylindrical bucket 23 of a cylindrical wall construction of a diameter equal to the first diameter, wherein the cylindrical bucket is illustrated to be formed with a metallic floor 24 to enhance heat transfer through the floor into fluid contained within the cylindrical bucket. A cylindrical bucket flange 25 mounted in surrounding relationship relative to an upper terminal end of the bucket 23 about the side wall extends exteriorly of the side wall a width equal to a second diameter greater than the first diameter to mount the cylindrical flange 25 in abutment with the top wall 13 permitting access to contents of the bucket by a pet. The side walls 12 may be further formed with insulated side wall inner panels 22 to enhance insulative properties of the housing structure in use when the illumination bulb 16 is actuated and directs heat interiorly of the housing 11 within the housing chamber 15.

The FIGS. 4 and 5 illustrate the use of the side walls, including at least a plurality of side wall openings 26 to complementarily receive in a fixed relationship a lens plate 27 mounting a defuser lens 28 forwardly thereof projecting interiorly of the housing chamber 15 to permit illumination to be defused and directed through the defuser lens 28 and the associated lens plate 27 that is transparent to enhance visual indication and orientation of the organization during use during periods of limited available light.

The apparatus 10a is arranged to incorporate the defuser light panel structure of the FIGS. 4 and 5, and may be further provided as illustrated in the FIG. 3 with support posts 29 orthogonally projecting upwardly from the top wall 13 including a roof plate 30 mounted thereto. The roof plate 30 includes a transparent roof plate top panel 31, with a solar heated serpentine conduit coil 32 contained therebelow within the roof plate 30. A delivery conduit 33 directs water from the serpentine conduit coil 32 directed between the roof plate 30 and the top wall 13, including a delivery conduit insulation housing 34 formed with the delivery conduit 33. A return conduit 35 formed with return conduit insulation jacket structure 36 is directed from the top wall 13 to the roof plate top panel 31, wherein a fluid pump 38 effects circulation of such fluid in cooperation with a heating coil conduit 37 contained within the housing chamber 15 to enhance heating within the enclosure and enhance heating directed to the bucket 23.

As to the manner of usage and operation of the instant invention, the same should be apparent from the above disclosure, and accordingly, no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A heated pet watering dish apparatus, comprising,
   a housing, the housing including side walls, a top wall, and a floor plate defining a housing chamber therewithin, and
   an illumination bulb directed through one of said side walls, wherein actuation of the illumination bulb directs heating within the housing chamber, and
   the top wall including a top wall opening defined by a predetermined first diameter, and
   a cylindrical bucket, the cylindrical bucket including a cylindrical bucket side wall defined by a first diameter, and the cylindrical bucket side wall includes a cylindrical flange fixedly mounted to the cylindrical side wall adjacent an upper distal end of the cylindrical side wall, wherein the flange is defined by a second diameter greater than the first diameter for abutment upon the top wall when the cylindrical side wall is directed through the top wall opening, and
   each side wall of said side walls includes an insulated interior panel coextensive with each interior surface within the housing chamber in contiguous communication with each of said side walls, and each side wall includes a side wall top surface corner portion positioned below and contiguously with the top wall, wherein each corner portion includes a cylindrical receiving bore, and a cylindrical stabilizing bar is arranged for sliding reception within each cylindrical receiving bore, and at least one said side walls includes a side wall opening, and a lens plate mounted within the side wall opening, wherein the lens plate is transparent, and a defuser lens fixedly mounted to the lens plate, wherein the defuser lens is translucent to direct illumination through the defuser lens and the lens plate for visual indication of the housing.

2. An apparatus as set forth in claim 1 including a plurality of support posts orthogonally mounted to the top wall, the support posts project upwardly relative to the top wall and include a roof plate, the roof plate including a transparent roof plate top panel, and the roof plate including a solar heated serpentine conduit coil contained within the roof plate below the top panel, and a circulating fluid contained within the conduit coil, and a delivery conduit in fluid communication with the conduit coil directed from the roof plate to the top wall and a serpentine heating coil conduit contained within the housing chamber, and the delivery conduit in fluid communication with the heating coil conduit, and a fluid pump, and the heating coil conduit directed to the fluid pump, and a return conduit directed from the fluid pump through the top wall and into the floor plate in fluid communication with the serpentine conduit coil to effect fluid circulation from the serpentine conduit coil into the heating coil conduit to enhance heating within the housing chamber.

* * * * *